Patented Mar. 4, 1930

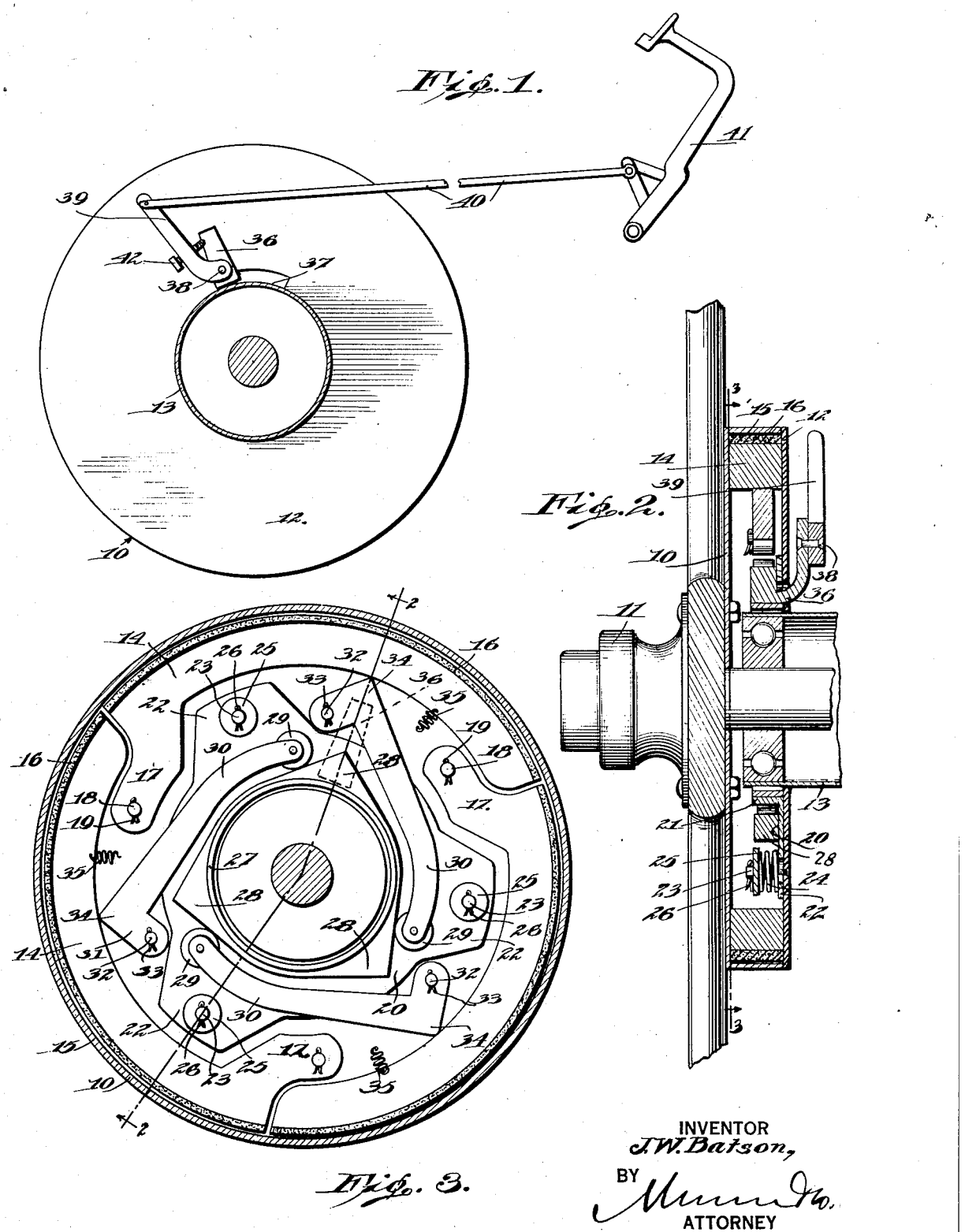

1,749,624

UNITED STATES PATENT OFFICE

JONAS W. BATSON, OF SPARTANBURG, SOUTH CAROLINA

BRAKE MECHANISM

Application filed February 13, 1928. Serial No. 254,017.

This invention relates to improvements in brake mechanisms generally, and more particularly to a type of the same as is usually employed on motor vehicles and the like.

The principal object of the invention is to provide for a brake device of the class set forth, and one of a comparatively simple and inexpensive construction and arrangement of parts, such as will be highly efficient and positive in action, and wherein the braking elements of each of the devices employed will be self-centering with respect to the braking surface of the wheel drums with which they are cooperative, so that the active braking surfaces or the linings of the braking elements will be uniformly applied to the braking surfaces of the drums, and the wear on the same evenly distributed over the entire areas thereof.

With the foregoing and other equally important objects and advantages in view, the invention resides in certain new and useful combinations, constructions and arrangements of parts as will be hereinafter more fully described, set forth in the appended claims, and illustrated in the accompanying drawing, in which:

Figure 1 is a side elevation of one of the braking units as it appears when installed in cooperative relation with one of the rear driving wheels of a motor vehicle, the axle housing and axle of such a wheel being shown in cross section, Figure 2 is a vertical section through a vehicle wheel and its axle mounting, and a drum mechanism mounted on the same for cooperation therewith, and Figure 3 is a vertical section taken on the line 3—3 of Figure 2.

Referring to the drawing, wherein similar characters of reference designate corresponding parts throughout the several views thereof, the embodiment of the invention, as shown therein, comprises a cylindrical brake drum 10, which is bolted or otherwise secured to the inner side of the hub portion 11 of an automobile, or the like, in the usual manner of such devices. The normally inner open side of the drum 10 is preferably closed by an inner wall or disc 12, which is secured against rotation with the drum by being attached to the adjacent part of the vehicle, as, for instance, to the axle housing 13.

Mounted within the drum 10 are a series of brake shoes 14, of segmental form which are each of a length of substantially 120° or slightly less than one-third of the circumference of the peripheral wall 15 of the drum, and are positioned therein in a manner to have their outer curved faces uniformly opposed to the inner surface of the peripheral wall 15, which faces are preferably covered with a brake lining fabric 16. Similar ends of each of the brake shoes 14 are angularly inset, as at 17, to underlie the opposite ends of the adjacent brake shoes, and to receive in apertures formed in the same suitable pins or pivot members 18, on which they are to be swung into and from operative braking relation to the inner face of the peripheral wall 15. These pivot members or pins 18 are projected inwardly of the drum 10 from the inner side of the stationary wall or disc 12, and for passing through the apertures of the inset portions 17, of the brake shoes 14, have cotter pins or the like 19 passed diametrically through the same to hold the brake shoes in position thereon.

Arranged at the inner side of the stationary wall or disc 12 is a member or plate 20, which has a hub portion 21 surrounding the axle support or housing 13. The outer edge portion of this member or plate 20 is formed to provide for a number of radially disposed extensions or portions 22, corresponding to the number of brake shoes 14 employed in the device, which are apertured to fit loosely over guide members or pins 23, projecting inwardly of the drum 10 from the inner side of the wall or disc 12. Mounted on each of these guide members or pins 23, at the inner side of the plate portions or extensions, and arranged to bear against the same to force the member or plate 20 into frictional contact with the opposed inner face of the wall or disc 12, is a coiled spring 24. A washer 25 is fitted over the free end of each guide pin 23 to abut against the adjacent outer ends of the springs 24, and is secured in such position by means of a cotter pin or the like 26.

Mounted for rocking or oscillating movements on the outer periphery of the hub portion 21 of the member or plate 20 is a cam body 27, on the peripheral edge of which is formed a series of cam elements or surfaces 28, corresponding in number to that of the brake shoes 14. Cooperative with one of the similar sides of each of these cam elements 28 is a roller 29, journaled in one end of an arm 30, which has its opposite end formed to provide an angularly offset portion 31, and which is apertured for engagement on a pivot member or pin 32. These arms 30 are secured on the pivot pins 32 against accidental displacement therefrom by means of cotter pins or the like 33. The angled corners 34, formed by the outer edge portions of the arms 30 and the offset portions 31, are disposed in contacting relation with the inner curved sides or edges of the brake shoes 14 at all times, and in their normal position of operation, as when the brake shoes 14 are not acting to check or brake the rotation of the drum 10, and consequently the wheel of the vehicle on which the brake devices are mounted, the arms 30 are lowered at their forward ends from the adjacent sides of the cam elements 28, so that the brake shoes 14 are supported on the angled corners 24 in uniformly spaced relation with respect to the inner face of the peripheral portion 15 of the drum 10. Secured to the inner sides of the free end portions of the brake shoes 14 are coiled springs or the like 35, which each have their other ends secured to the stationary inner wall or disk 12 so as to act to tension the brake shoes 14 away from braking contact with the drum portion 15, and to otherwise sustain them normally against the points or corners 34 of the arms 30.

To operate the cam member or body 27 and the friction plate 20 on the hub of which the cam body is mounted, an angularly offset arm 36 is projected rearwardly from the plate 20, and is movable in reverse directions in an arcuate slot 37 formed in the inner wall or disc 12, of the drum 10. The outer end of the arm 36 is preferably upturned and has pivoted thereto, on a pivot pin 38, an actuating arm or lever 39, which is connected at its free end to a rod or cable 40 leading to and connecting the usual brake operating lever or pedal 41 on a motor vehicle or the like on which the device is mounted. To adjust the throw of the actuating lever or arm 39, and consequently to compensate for wear on the brake lining 16 of the brake shoes 14 and the other operative parts of the device in its entirety, an adjusting screw or the like 42 is threaded through an aperture in the lever or arm 39 in a manner to have its free inner end bear against the adjacent edge of the upturned portion of the cam operating arm 36. By adjusting this screw 42, the angular relation of the two arms 36 and 39 will vary, and will correspondingly lengthen or shorten the operating movements of the cable or rod 40 and the foot lever or pedal 41.

With the brake device as thus constructed and arranged and mounted on a wheel of a vehicle, the entire cam assembly is held in place, in its normally inoperative position, by the friction produced between the opposed surfaces of the inner wall or disc 12 and the member or plate 20 under the action of the coiled springs 24, while the other elements of the device are tensioned in their inoperative positions by the coiled springs 35, as will be obvious. When it is desired to set the brake, the lever or pedal 41 is operated to exert a pull on the cable or rod 40, and consequently on the lever arm 39, and through the medium of the screw 42 on the arm 36. As these parts move under the action of the lever or pedal 41, the frictional resistance between the plate 20 and the wall or disc 12 is overcome, and the cam body 27, together with the plate 20, is rocked on the axle housing 12, with the initial movement of the cam body 27, the cam elements 28 move under the rollers 29, and cause the arms 30 to swing outwardly on their pivots 32. As the arms 30 swing outwardly, the contact points 34 thereof move along the inner curved surfaces of the brake shoes 14, forcing the same outwardly on their pivots 18, and into contact with the inner surface of the peripheral wall 15 of the drum 10. The tension effect of these springs 24 is such that a considerable more force is necessary to move the cam 27 than to merely expand the brake shoes outwardly against the inner face of the peripheral portion 15 of the drum 10, so that, as will be obvious, the brake shoes will have been expanded to practically their full force and effect before the high points of the cam elements center themselves with respect to the rollers 29. After the cam assembly has once been adjusted to a proper cooperative relation with respect to the brake shoe actuating levers 30, and to the actuating lever or pedal 41, it is not necessary that it be given attention until there may be an indication of uneven wear on the brake shoes or the linings thereof. As soon as the lever or pedal 41 is released by the operator of an automobile, after each operative movement of the same, the parts of the braking device will be returned to normal position in the usual manner, and as hereinbefore explained. It is to be noted that the lever or foot pedal 41 may be provided with the usual form of spring tension device (not shown), whereby it is returned to its normally inoperative position.

Without further description, it is thought that the features and advantages of the invention will be readily apparent to those skilled in the art, and it will of course be understood that changes in the form, proportion and minor details of construction may be resorted to, without departing from the spirit of the invention or its scope as claimed.

Having thus fully described the invention, what is claimed is:

1. A brake mechanism for motor vehicles and the like, comprising a brake drum, a plurality of brake shoes of segmental form mounted within said drum for cooperation with the inner peripheral wall thereof, means pivoting said brake shoes at one end for outward swinging movements to operative positions, a cam member mounted for rocking movements centrally of said drum, means operatively connecting said cam member to a usual brake operating lever, angled levers pivoted at one end in interposed relation between said brake shoes and said cam member for transmitting motion from the latter to the former, rollers carried by said levers for rolling contact with the elements of said cam member, means for automatically returning the parts to normal positions at the end of each braking operation, and means for checking free movements of said cam member.

2. A brake mechanism for motor vehicles and the like, comprising a brake drum, a plurality of brake shoes of segmental form mounted within said drum for cooperation with the inner peripheral wall thereof, means pivoting said brake shoes at one end for outward swinging movements to operative positions, a cam member mounted for rocking movements centrally of said drum, means operatively connecting said cam member to a usual brake operating lever, angled levers pivoted at one end in interposed relation between said brake shoes and said cam member for transmitting motion from the latter to the former, rollers carried by said levers for rolling contact with the elements of said cam member, means for automatically returning the parts to normal positions at the end of each braking operation, and friction means for checking free movements of said cam member.

Signed at Spartanburg, in the county of Spartanburg and State of South Carolina, this 9th day of February, 1928.

JONAS W. BATSON.